US 8,223,725 B2

(12) United States Patent
Chen

(10) Patent No.: US 8,223,725 B2
(45) Date of Patent: Jul. 17, 2012

(54) TELECOMMUNICATIONS

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 690 days.

(21) Appl. No.: 10/588,741

(22) PCT Filed: Feb. 4, 2005

(86) PCT No.: PCT/GB2005/000386
§ 371 (c)(1),
(2), (4) Date: Oct. 30, 2007

(87) PCT Pub. No.: WO2005/078979
PCT Pub. Date: Aug. 25, 2005

(65) Prior Publication Data
US 2009/0201895 A1    Aug. 13, 2009

(30) Foreign Application Priority Data

Feb. 6, 2004   (GB) .................................. 0402654.8

(51) Int. Cl.
*H04W 4/00*    (2009.01)
*H04L 12/28*   (2006.01)
*H04J 3/24*    (2006.01)
(52) U.S. Cl. .................... 370/338; 370/389; 370/475
(58) Field of Classification Search .................. None
See application file for complete search history.

(56) References Cited

U.S. PATENT DOCUMENTS

| 6,915,325 B1* | 7/2005 | Lee et al. ...................... 709/202 |
| 2002/0015396 A1* | 2/2002 | Jung ............................. 370/338 |
| 2005/0041634 A1* | 2/2005 | Aura ............................. 370/351 |

OTHER PUBLICATIONS

The International Search Report mailed Jun. 3, 2005 for corresponding Application No. PCT/GB2005/000386.
Perkins et al. "Route Optimization in Mobile IP. <draft-ietf-mobileip-optim-09.txt>." IETF Mobile IP Working Group. Internet Draft. Feb. 15, 2000.
Soliman et al. "Hierarchical mobile IPv6 mobility management (HMIPv6) <draft-ietf-mobileip-hmipv6-08.txt>." IETF Standard-Working Draft, Internet Engineering Task Force, IETF, CH. vol. mobileip, No. 8. Jun. 2003.

* cited by examiner

*Primary Examiner* — Bob Phunkulh
*Assistant Examiner* — Srinivasa Reddivalam
(74) *Attorney, Agent, or Firm* — Knobbe Martens Olson & Bear LLP

(57) ABSTRACT

In a MIPv6 network, a mobile home agent (MHA) in a foreign network (FN) acts as an intermediate node between a mobile node (MN) and a correspondent node (CN) and allocates itself a secondary care-of address (SCoA) different from the care-of address (CoA) of the mobile node (MN), with a one-to-one relationship between the secondary care-of address (SCoA) and the home address (HAddr) of the mobile node.

18 Claims, 13 Drawing Sheets

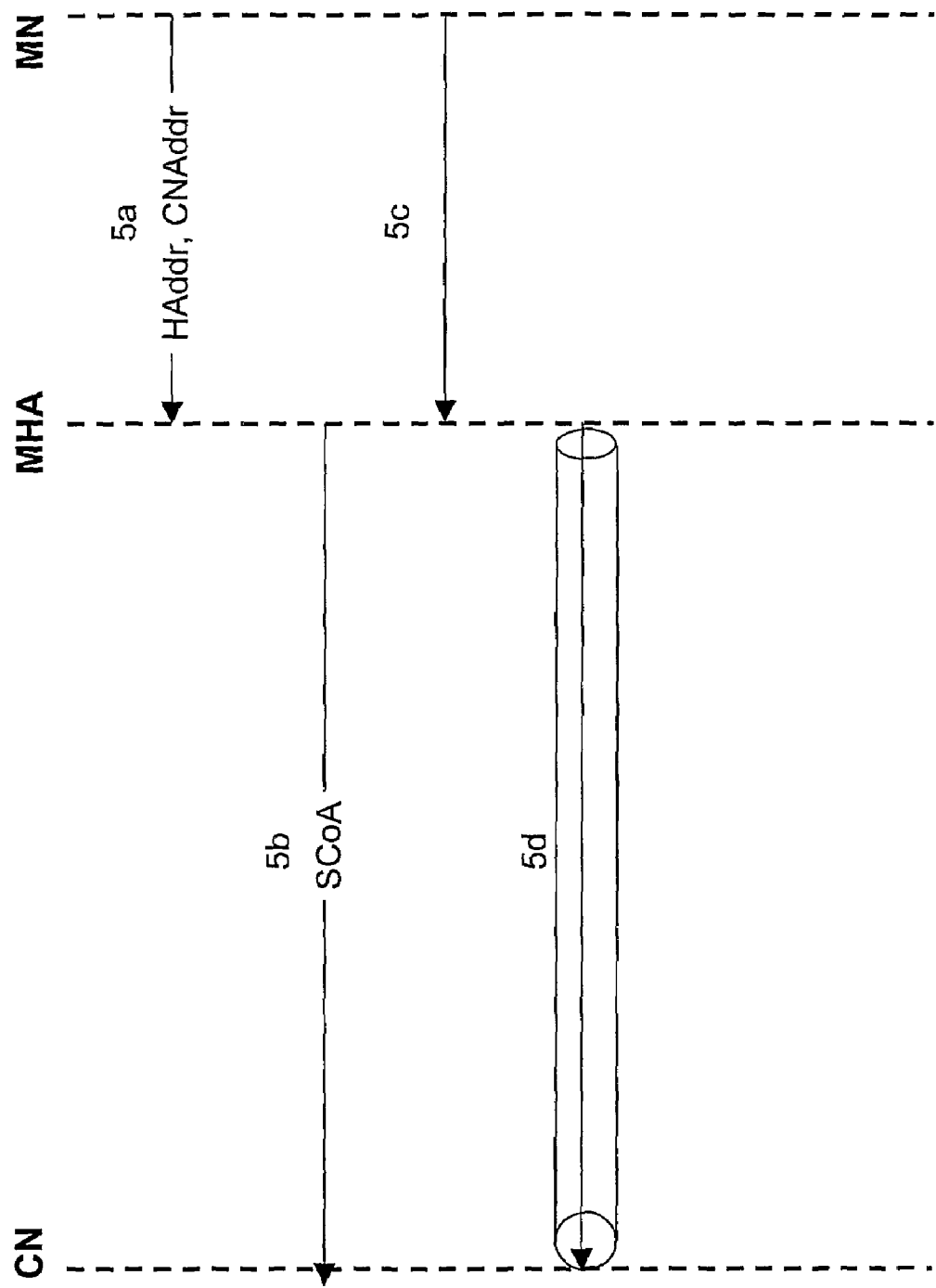

TELECOMMUNICATIONS

FIELD OF THE PRESENT INVENTION

The present invention relates to apparatus for and methods of supporting mobile internet protocol (MIP) networks.

BACKGROUND

Whereas conventional 2G mobile networks, such as those conforming to the Global System for Mobile Communications (GSM) standards, have provided circuit-switched voice and data services to user's mobile stations (MSs), there is great momentum in the mobile telecommunications industry to deploy packet-switched mobile networks. Packet-switched mobile networks have significant advantages in terms of network and resource efficiency and also enable the provision of more advanced user services. With the convergence of fixed and mobile telecommunications networks, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognised benefits over IPv4, notably in terms of greatly increased address space, more efficient routing, greater scalability, improved security, Quality of Service (QoS) integration, support for multicasting and other features.

Particular examples of mobile packet-switched services currently being deployed include the General Packet Radio Service (GPRS) as implemented in both 2G GSM networks and in 3G Universal Mobile Telecommunications System (UTMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centres, airports, exhibition centres, etc). Consequently mobile network operators will want to support roaming of mobile stations between GPRS and non-GPRS networks or subnetworks.

The reader is referred to the GPRS Service Description (release 1999) Technical Specification, referred to as 3G TS 23.060 v3.12.0 (2002-06) and available from the 3GPP website at http://www.3gpp.org/ftp/specs/2002-06/R1999/23_series1, which provides a detailed service description for 2G (GPRS/GSM) and 3G (GPRS/UMTS) mobile packet networks. The functionality of GPRS networks is also generally well known, although further aspects will be described in detail below.

In order to access GPRS packet-switched services, a MS first performs a GPRS attach procedure with an SGSN (either a 2G GSM GPRS attach or a 3G UMTS GPRS attach). Authentication, and location updating procedures are performed, and, if successful, the GPRS attach procedure makes the MS available for paging via the SGSN and notification of incoming packet data. However, to actually send and receive packet data, the MS must have an allocated Packet Data Protocol (PDP) address (e.g. an IP address) and must activate at least one PDP context for use with that PDP address. Each PDP address for a MS may have one or more PDP contexts associated with it and data defining the PDP contexts is stored in the MS, the SGSN, and the GGSN. The process of PDP context activation makes the MS known not only to the SGSN, but also to the corresponding GGSN and inter-working with external data networks can commence.

While GPRS networks, having been designed from the start as mobile networks, have built-in mobility management (for MSs within the GPRS network) and roaming functionality (for MSs roaming between GPRS networks), work has also taken place in the Internet Engineering Task Force (IETF) to support mobility of IP user terminals in general. To this end, the IETF have developed the Mobile IP (MIP) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network. Mobile IP is not expected to be used for mobility management within a network or subnetwork (micro-mobility) which is typically managed by access technology specific layer 2 mechanisms such as WCDMA handover.

There are two versions of MIP to correspond to the two versions of IP. MIP version 4 (MIPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 2002 available at the IETF website http://www.iet.org/rfc/rfc2002.ttxt?number=2002. Internet draft MIPv6 is described in the IETF Internet draft "Mobility Support in IPv6" available at the time of writing on the IETF website at http://www.ietf.org/internet-drafts/draft-ietf-mobileip-ipv6-24.txt and referenced as draft-ietf-mobileip-ipv6-24.txt, dated 30 Jun. 2004.

A scenario involving MIP roaming with routing optimisation is illustrated in FIG. 1. A mobile node (MN) is allocated a home IP address (HAddr) in its Home Network (HN). Routing procedures in the HN ensure that wherever the MN is within the HN, an IP packet sent from a Correspondent Node (CN) over an IP network (IPN) will reach the MN. When the MN roams to a foreign network (FN), the MN is assigned a Care of Address (CoA) within the FN to which IP packets will need to be routed. However, the roaming must be transparent to the IP layer during a session, so that packets created by the IP layer of the CN will continue to carry the HAddr as the destination address.

Under the MIPv6 route optimisation protocol, the MN sends a binding update to the CN when roaming into the FN, to inform the CN of the CoA. The MIP layer of the CN then sets the destination address of subsequent packets in the session to the CoA, and places the HAddr in a Routing Header Type 2 extension header of the packet. At the MN MIP layer, the HAddr is retrieved from the Routing Header Type 2 extension header and used as the destination address in the corresponding packet passed to the IP layer.

Route optimisation is mandatory in MIPv6, but does not form part of MIPv4. An alternative roaming protocol without route optimisation is shown in FIG. 2. An IP session is set up between the CN and the MN in its HN. The MN roams into the FN during the session, and sends a binding update to inform a Home Agent (HA) in the HN of the CoA in the FN. The HA forms part of a gateway between the IPN and the HN. In this example, the FN is a GPRS network connected to the IPN through a GGSN.

In response to the binding update, the HA sets up an IP tunnel to the CoA by intercepting any subsequent packets with the HAddr as the destination address and encapsulating them in packets with the IP address of the HA (HAAddr) set as the source address and the CoA of the MN set as the destination address. The MIP layer of the MN decapsulates the packets and passes them to the IP layer so that the roaming is transparent to the IP layer. This tunnelling may be achieved using IPv6 Generic Packet Tunnelling Mechanism described in IETF RFC 2473.

In the uplink direction, the MN may not need to change the source and destination address of its packets after roaming into the FN, because the IP address of the CN has not changed. However, the FN may need to apply ingress filtering to outgoing packets, so that any packets with a source address not within the FN are blocked. This may be implemented by a gateway with a packet classifier to check the network prefix of the source address set to match that of the FN. As a result, packets from the MN, bearing the HAddr as the source address with a network prefix different from that of the FN, would be blocked.

To address this problem, the MIPv4 and MIPv6 standards include a reverse tunnelling protocol in which the MN sets up a tunnel in the uplink direction between its CoA and the HAAaddr. Since the uplink packets are encapsulated in packets carrying the CoA as the source address, and the CoA is within the FN, the ingress filter will allow the encapsulated packets to pass. The HA decapsulates the packets and forwards them to the CN. MIPv6 reverse tunnelling is described for example in the IETF Mobile IP Working Group Draft 'Mobility Support in IPv6', 29 Oct. 2002, located at the time of writing at http://www.iet.org/internet-drafts/draft-ietf-mobileip-ipv6-24.txt In IPv4, the number of possible IP addresses is limited and it is therefore not desirable to allocate a unique CoA to each MN roaming in a FN. The MIPv4 standard therefore allows multiple MN's to share a CoA allocated to a Foreign Agent (FA) within the FN. FIG. 3 shows the use of an FA in MIPv4. Packets are tunnelled between the HA and the FA at the CoA, and the FA routes the packets to the MN within the FN.

It is generally accepted that access to a network should be under the control of the operator or service provider of that network. Many important 3G functions, such as Service-Based Local Policies (SBLP) are based on this network-centric control principle. However, the existing MIPv6 standards work on an end-to-end basis that does not involve individual networks. For example, the MN interacts with its HA and its CN without notifying its current network, such as the foreign or visited network, that it is being camped on. The end-to-end control model of MIPv6 will be broken if foreign or visited networks enforce local policies.

SUMMARY OF THE PRESENT INVENTION

According to one aspect of the present invention, there is provided a network entity in a foreign network visited by a mobile node, which acts as an intermediate node having direct contact with a correspondent node in a session between the mobile node and the correspondent node. The network entity may receive packets in the session addressed to the entity from the correspondent node and/or may send packets addressed to the correspondent node with an address of the entity as the source address. A care-of address allocated to the network entity may have a one-to-one relationship to the home address of the mobile node.

According to another aspect of the present invention, there is provided a network entity in a foreign network visited by a mobile node, which acts as an intermediate node in a session between the mobile node and the correspondent node and has a secondary care-of address with a one-to-one relationship to a care-of address of the mobile node in the foreign network.

In an embodiment of the present invention, a mobile home agent (MHA) or Secure Gateway is introduced into a network such a foreign or visited network. Data sent to or received from the mobile node is always routed through the mobile home agent.

BRIEF DESCRIPTION OF DIAGRAMS

FIG. 8a is a time diagram illustrating a fifth embodiment of the invention, in which data is sent from the MN to the CN via the tunnel from the MHA to the CN.

DETAILED DESCRIPTION OF EMBODIMENTS OF THE PRESENT INVENTION

In the following description, the MHA is a network entity. For example, it may be co-located at a gateway of the FN. The operation of the MHA in different scenarios involving sending a packet to or from the MN will be described in the First to Fifth embodiments below.

First Embodiment

The first embodiment is a first alternative method of sending a packet from the CN to the MN. When the MN roams into the FN, it must register with the FN in order to send and receive packets through the FN. The MN is allocated a CoA in the FN.

Figure 1:
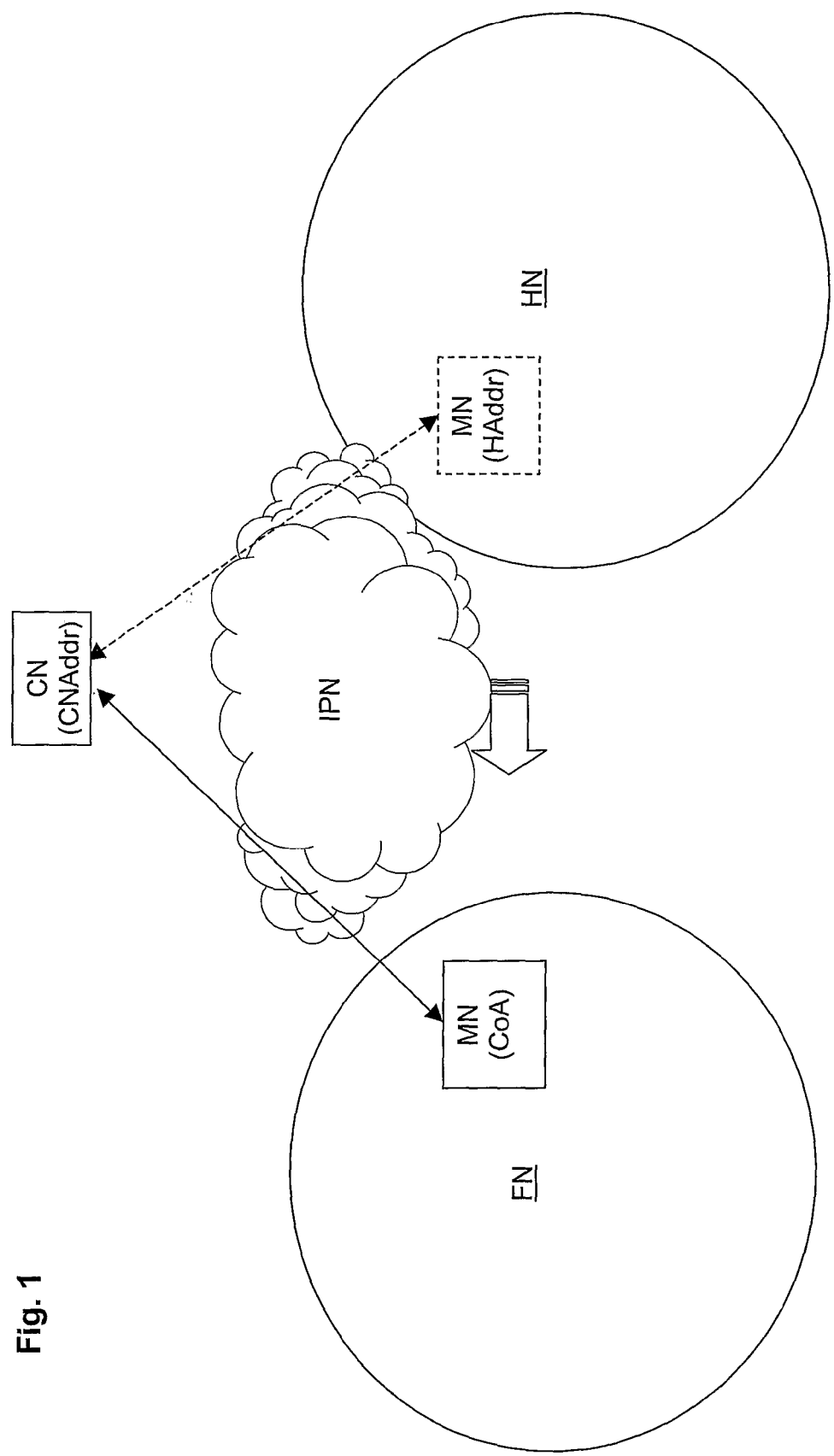
FIG. 1 is a diagram illustrating MIP roaming using route optimization.
Figure 2:
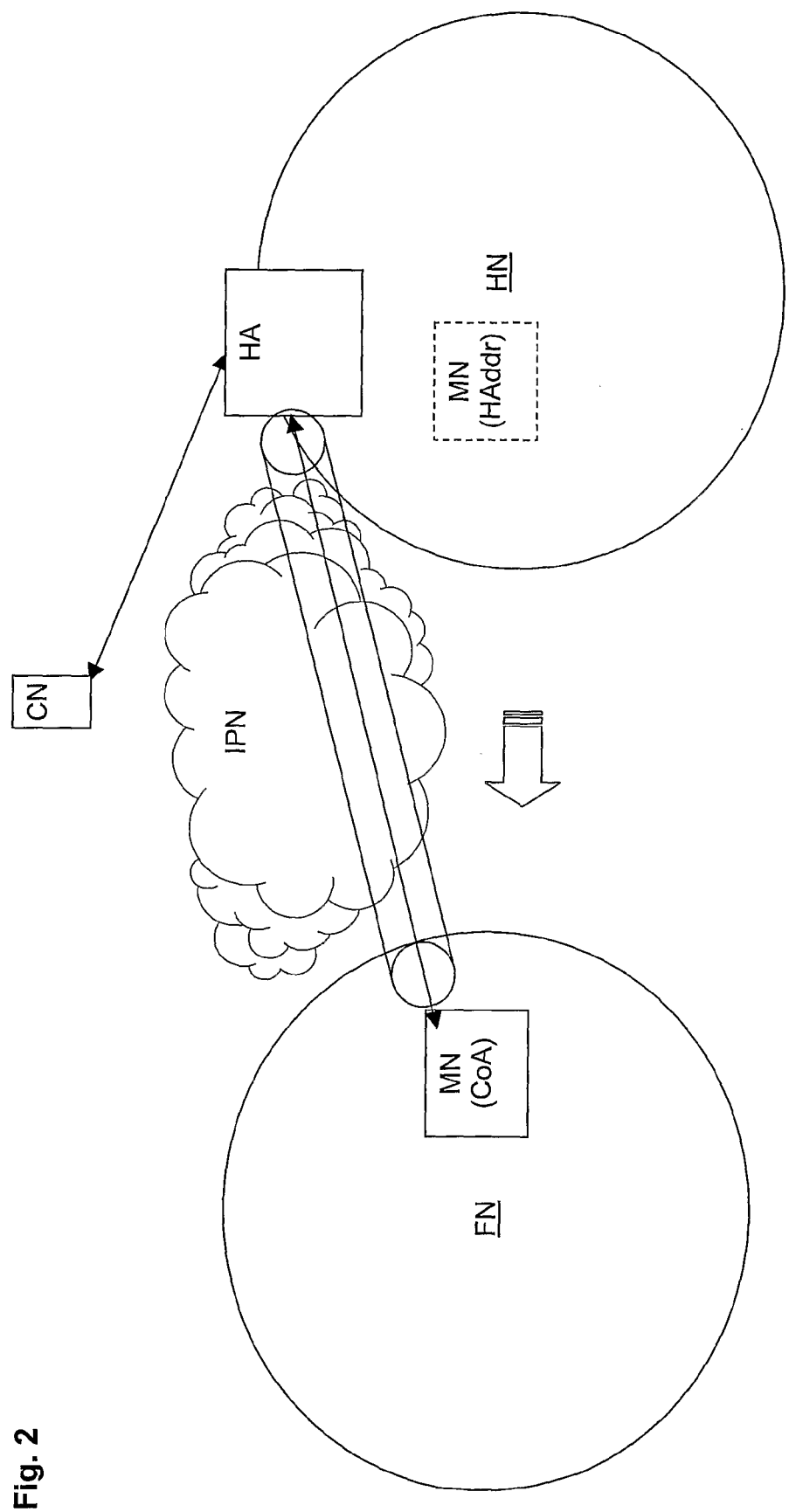
FIG. 2 is a diagram illustrating MIP roaming without route optimization.
Figure 3:
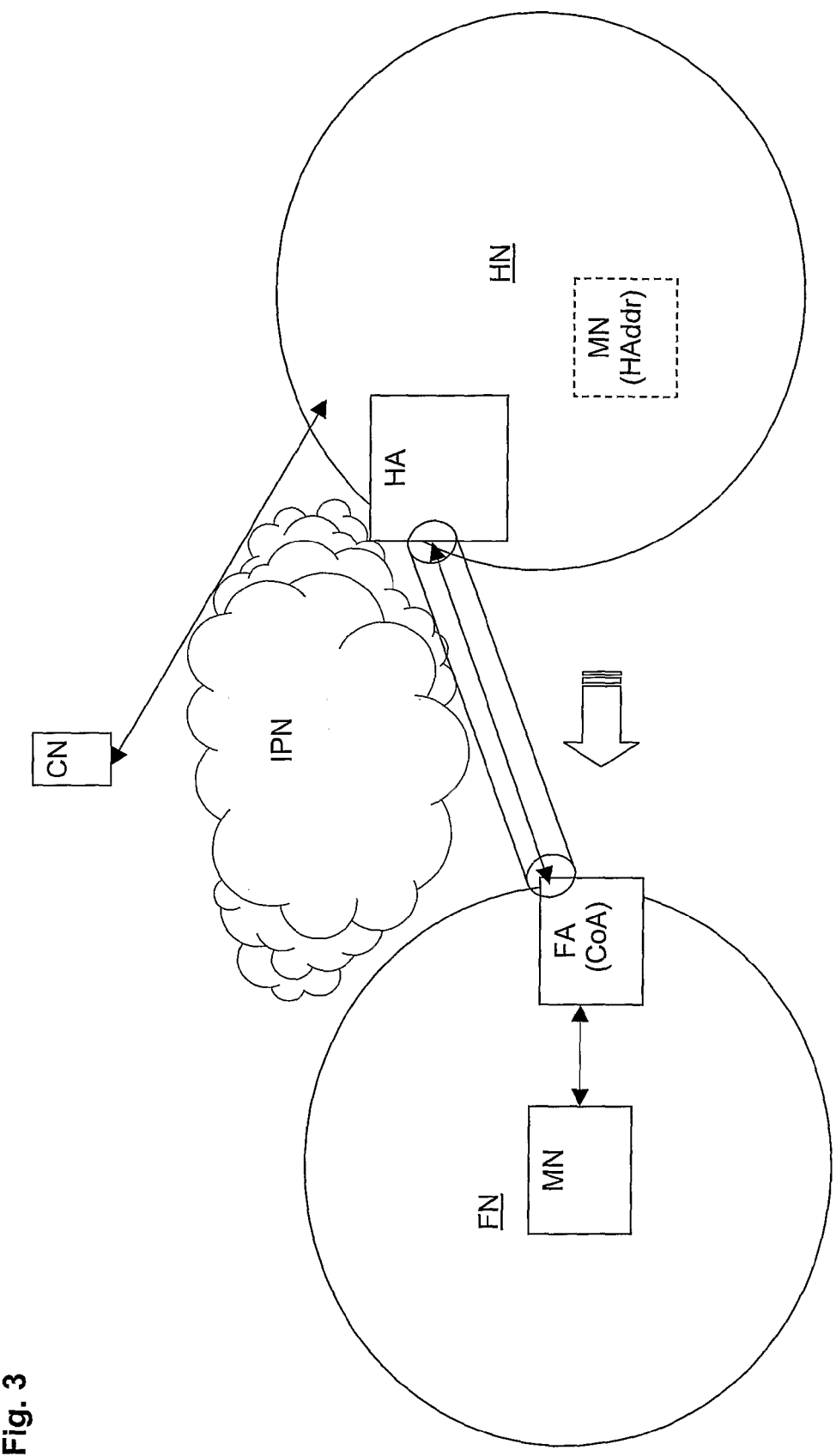
FIG. 3 is a diagram illustrating MIP roaming with a foreign agent.
Figure 4A:
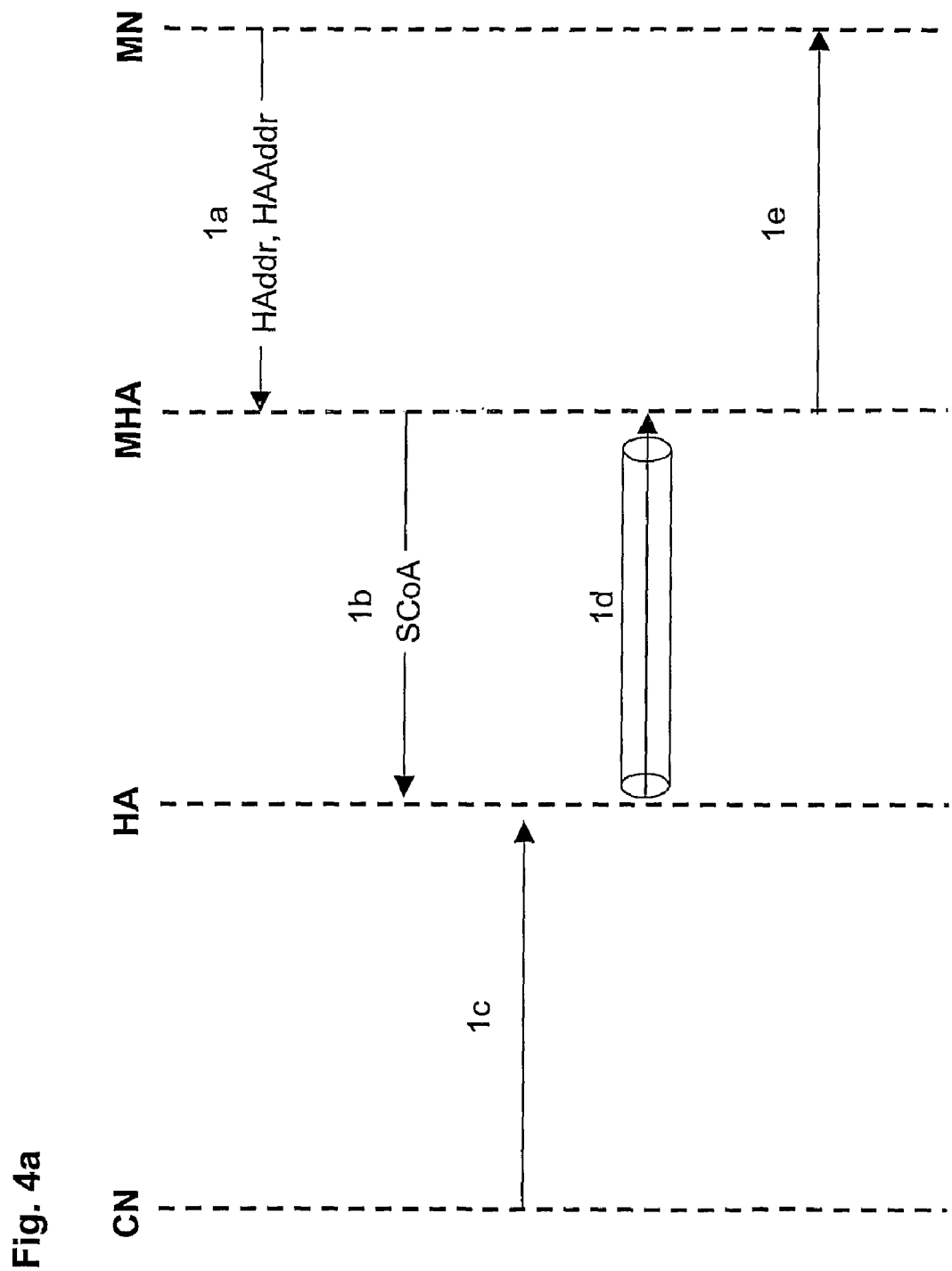
FIG. 4a is a time diagram illustrating a first embodiment of the invention, in which data is sent from the CN to the MN via a tunnel from the HA to the MHA.

As part of the registration process, shown in FIG. 4a, the MN sends a first binding update (BU) at step 1a, to notify the MHA of the HAddr and HAAddr. In a case where the MHA is not already aware of the CoA, the MN also includes the CoA in the BU. However, if the MHA is co-located at the gateway to the FN, it may already have been notified of the CoA by an internal process within the gateway.

Also as part of the registration process of the MN, the MHA allocates itself a Secondary Care-of Address (SCoA) which has a one-to-one mapping with the HAddr of the MN, and sends a second BU at step 1b to notify the HA of the SCoA. This allows a tunnel to be set up from the HA to the MHA, as will be described below.

Figure 4B:
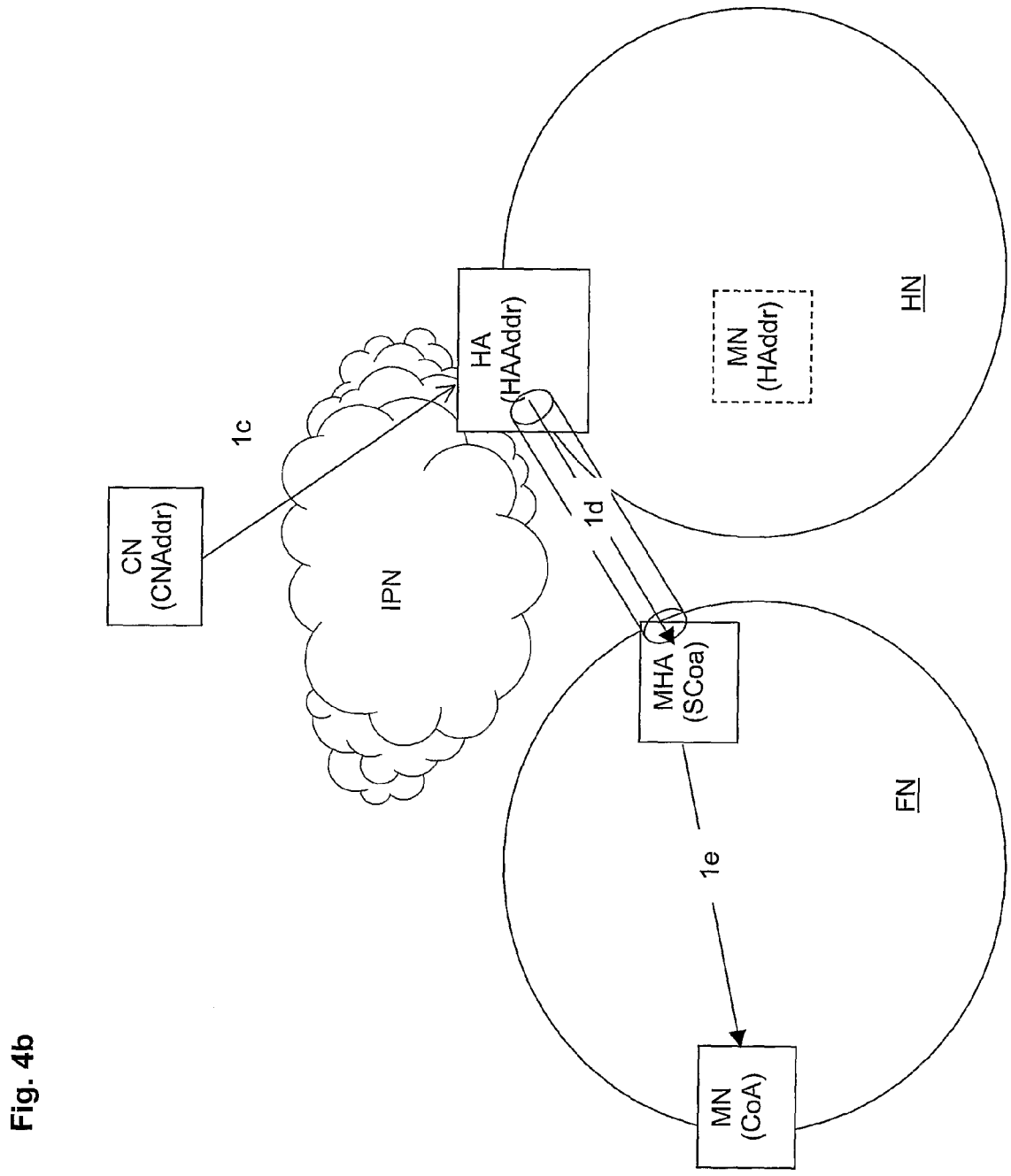
FIG. 4b is a network diagram illustrating the first embodiment.

The roaming status of the MN is transparent to the CN, so the CN sends a packet to the MN with CNAddr as the source address and HAddr as the destination address. The process of sending packets from the CN to the MN is shown in FIGS. 4a and 4b. At step 1c, the CN sends the packet over the IPN, which routes it to the HN on the basis of the destination address. The packet is intercepted by the HA, which is aware of the roaming status of the MN and forwards the packet at step 1d through the tunnel to the MHA at the SCoA. In other words, the packet is encapsulated as follows:

Outer IP Header: Src: HAAddr Dest: SCoA
Inner IP Header Src: CNAddr Dest: HAddr

The MHA decapsulates the packet by stripping off the outer IP header, and sends the inner packet at step 1e to the MN. As this step is performed within the FN, it is immaterial that the destination address of the packet is not the current address of the MN. For example, the FN may route the packet to the MN using an Address Resolution Protocol (ARP) which discovers a medium access control (MAC) address for communication with the MN within the FN. The MAC layer operates between the IP layer and the physical layer and determines how packets are transported over the physical layer. As the present description is concerned primarily with the mobile IP layer, and MAC protocols are well known, the MAC layer will not be discussed further.

However, the IP layer of the MN will only deliver to the upper layers the packets addressed to HAddr, as the roaming status of the MN is transparent to the upper layers, although not to the mobile IP layer below it.

Steps 1e to 1e are repeated for each packet sent from the CN to the MN while the MN is in the FN.

Second Embodiment

The second embodiment is a second alternative method of sending a packet from the CN to the MN. In this alternative, a tunnel is set up directly from the CN to the MHA, bypassing the HA. However, the HA may take part in setting up a session.

Figure 5A:
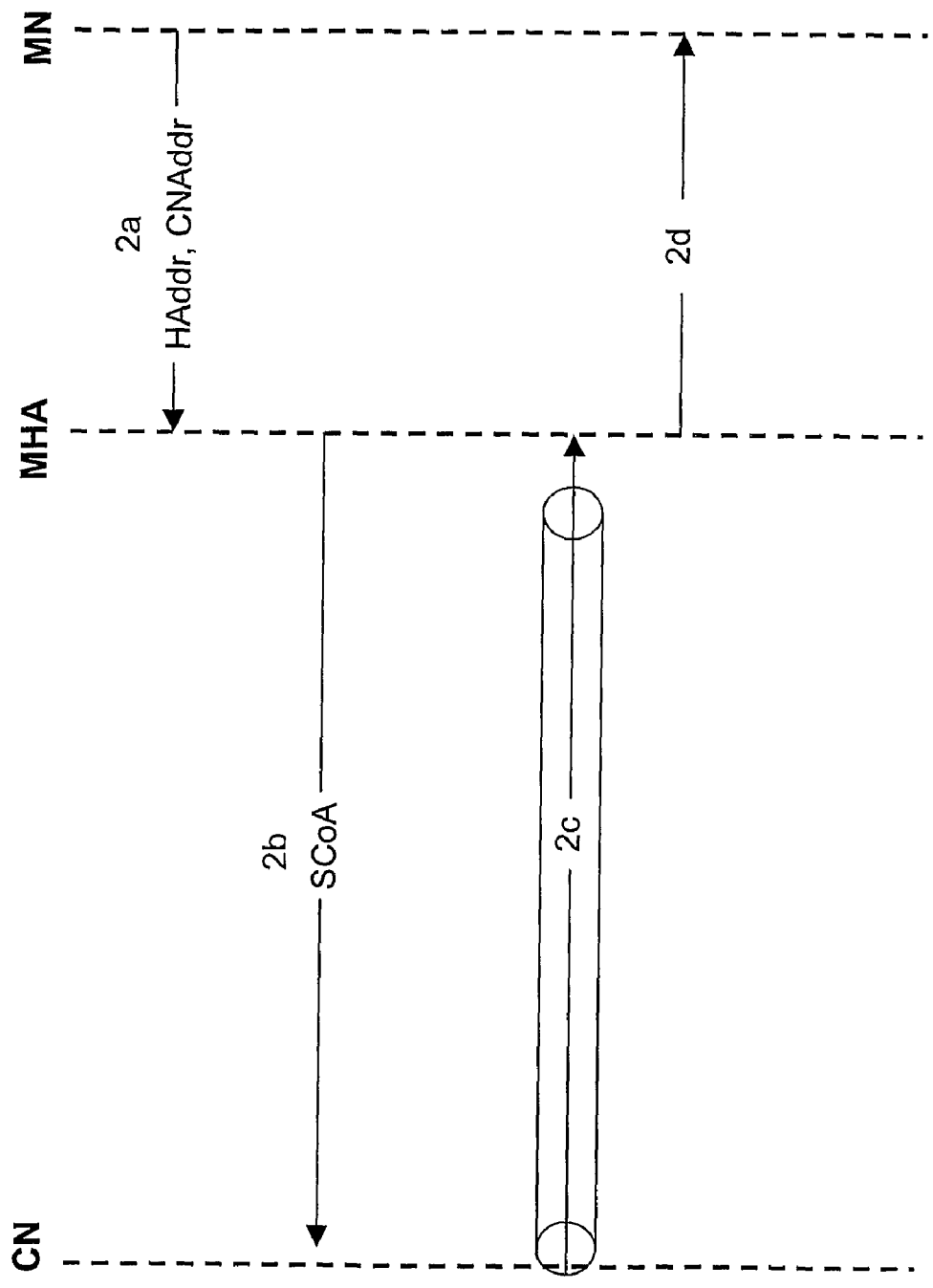
FIG. 5a is a time diagram illustrating a second embodiment of the invention, in which data is sent from the CN to the MN via a tunnel from the CN to the MHA.

As part of the registration process, shown in FIG. 5a, the MN sends a first binding update (BU) at step 2a, to notify the MHA of the HAddr and the CNAddr. In a case where the MHA is not already aware of the CoA, the MN also includes the CoA in the BU. However, if the MHA is located at the gateway to the FN, it may already have been notified of the CoA by an internal process within the gateway.

The MN may be aware of the CNAddr because it is initiating a session to the CN or was already involved in a session with the CN when the MN roamed into the FN. Otherwise, the MN may have been notified of the CNAddr by the CN, using for example the first embodiment.

Also as part of the registration process of the MN, the MHA allocates itself a Secondary Care-of Address (SCoA) which has a one-to-one mapping with the HA of the MN, and sends a second BU at step 2b to notify the CN of the SCoA. This allows a tunnel to be set up directly from the CN to the MHA, as will be described below.

Figure 5B:
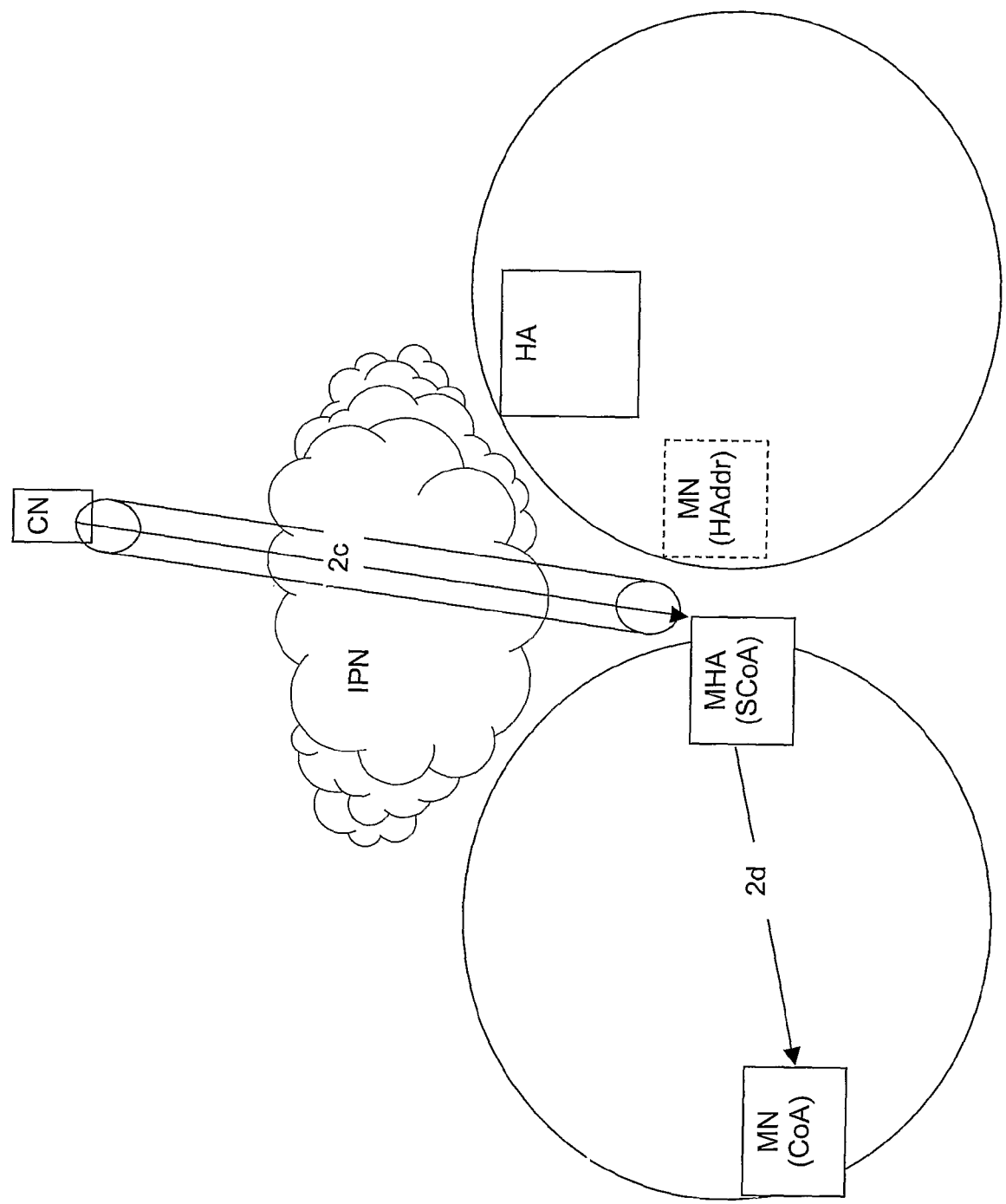
FIG. 5b is a network diagram illustrating the second embodiment.

The process of sending packets from the CN to the MN is shown in FIGS. 5a and 5b. The CN encapsulates a packet for sending to the MN, as follows:

| Outer IP Header: | Src: CNAddr | Dest: SCoA |
|---|---|---|
| Inner IP Header | Src: CNAddr | Dest: HAddr |

At step 2c, the CN sends the packet through the tunnel over the IPN, which routes the packet to the MHA at the SCoA. The MHA decapsulates the packet by stripping off the outer IP header, and sends the inner packet at step 2d to the MN.

Steps 2c and 2d are repeated for each packet sent from the CN to the MN while the MN is in the FN.

Third Embodiment

The third embodiment is a third alternative method of sending a packet from the CN to the MN. It is similar to the second embodiment, except that packets are sent to the MHA without tunnelling, and the MHA performs destination address translation to convert the destination address from the SCoA to the HAddr.

Figure 6A:
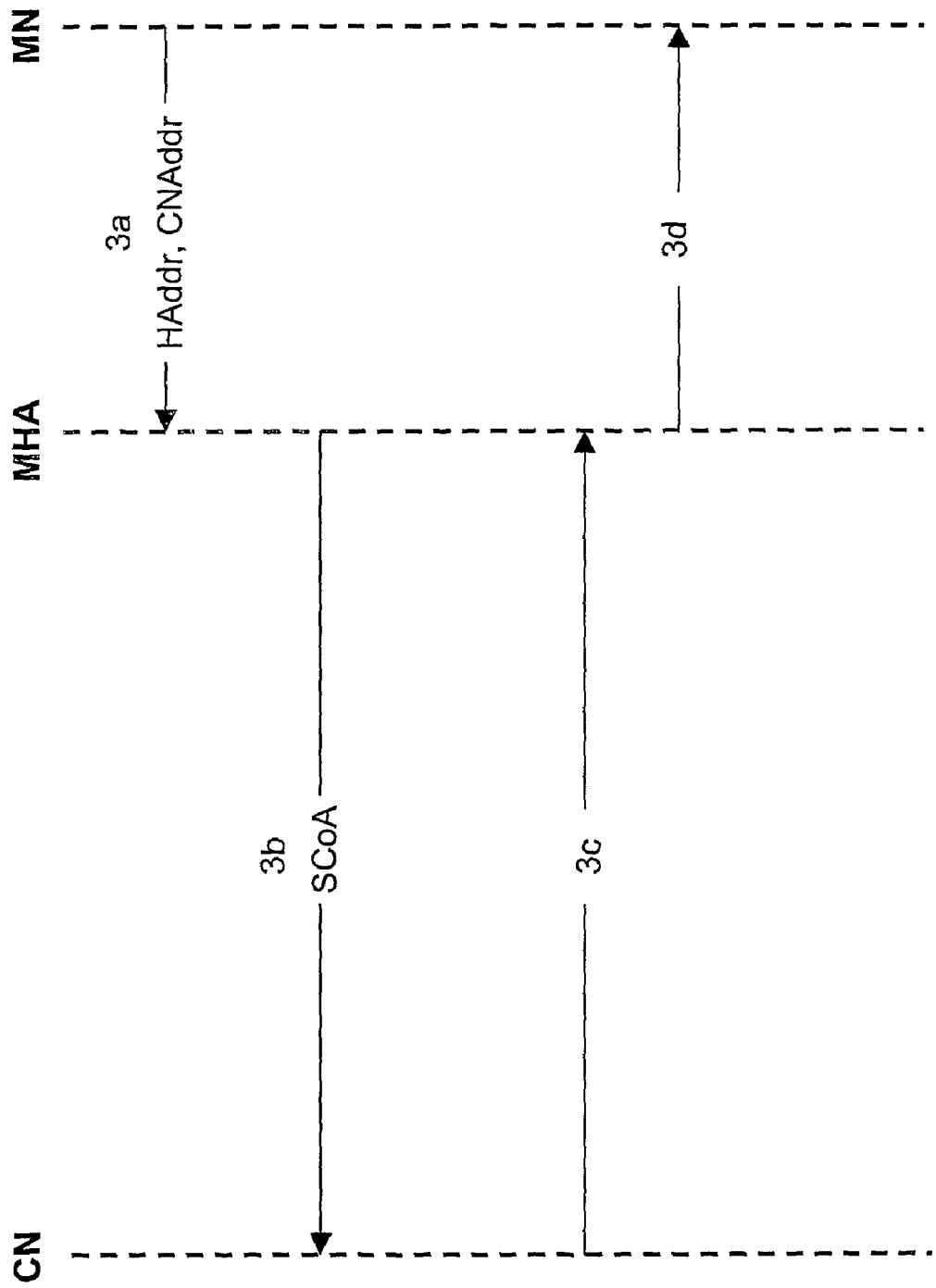
FIG. 6a is a time diagram illustrating a third embodiment of the invention, in which data is sent from the CN to the MN via the MHA using address translation.

As part of the registration process, shown in FIG. 6a, the MN sends a first binding update (BU) at step 3a, to notify the MHA of the HAddr in a case where the MHA is not already aware of the CoA, the IMN also includes the CoA in the BU. However, if the MHA is co-located at the gateway to the FN, it may already have been notified of the CoA by an internal process within the gateway.

Also as part of the registration process of the MN, the MHA allocates itself a Secondary Care-of Address (SCoA) which has a one-to-one mapping with the HAddr of the MN, and sends a second BU at step 3b to notify the CN of the SCoA.

The MN may be aware of the CNAddr because it is initiating a session to the CN or was already involved in a session with the CN when the MN roamed into the FN. Otherwise, the MN may have been notified of the CNAddr by the CN, using for example the first embodiment.

Figure 6B:
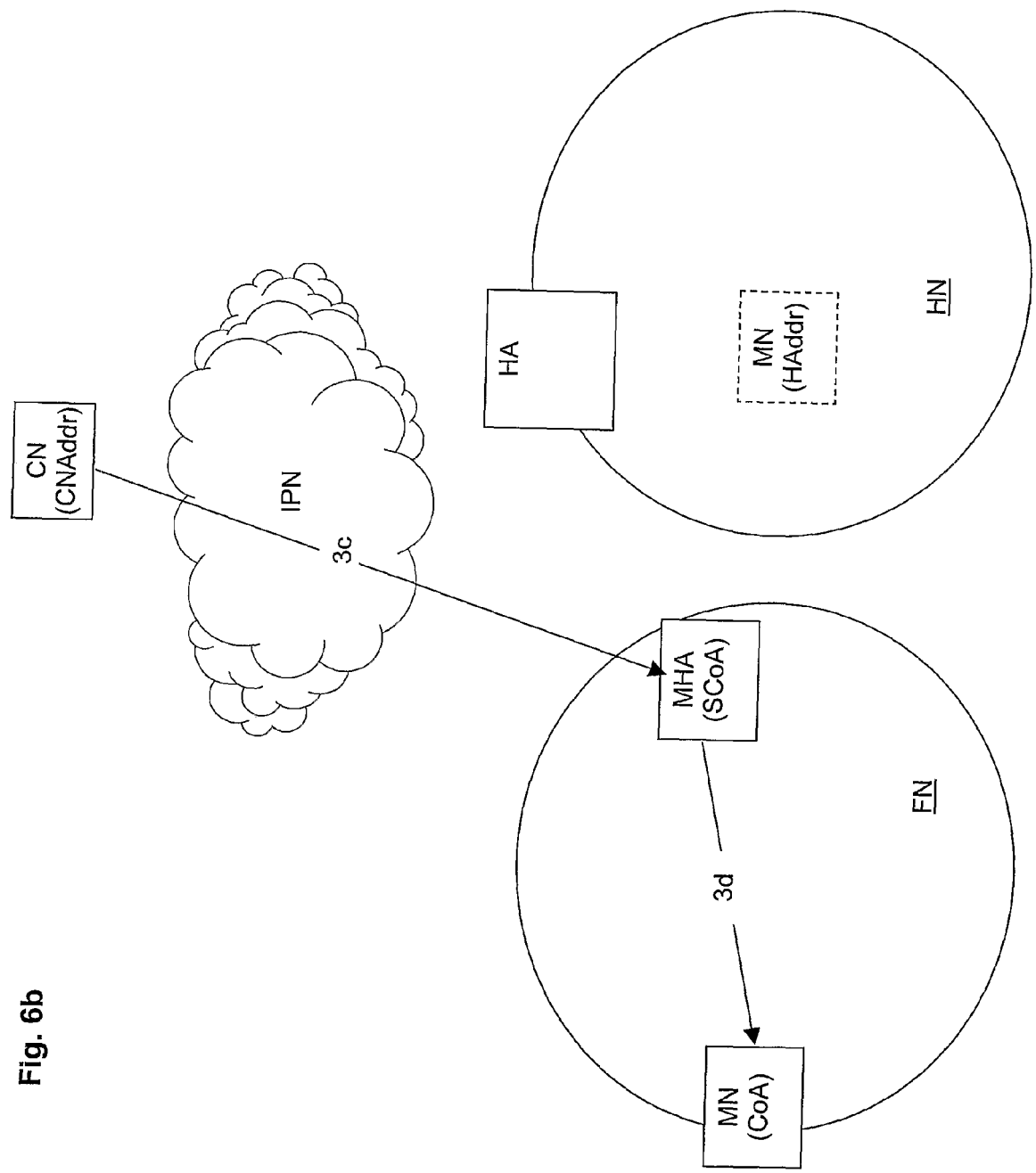
FIG. 6b is a network diagram illustrating the third embodiment.

The process of sending packets from the CN to the MN is shown in FIGS. 6a and 6b. The CN addresses a packet for sending to the MN with the source address as CNAddr and the destination address as SCoA. At step 3c, the CN sends the packet over the IPN, which routes the packet to the MHA at the SCoA.

The MHA performs destination address translation on the packet to replace SCoA by HAddr as the destination address of the packet, and sends the packet at step 3d to the MN.

Steps 3c and 3d are repeated for each packet sent from the CN to the MN while the MN is in the FN.

Fourth Embodiment

The fourth embodiment is a first alternative method of sending a packet from the MN within the FN to the CN. A reverse tunnel is set up between the MHA and the HA and packets are routed via the reverse tunnel to the CN.

Figure 7A:
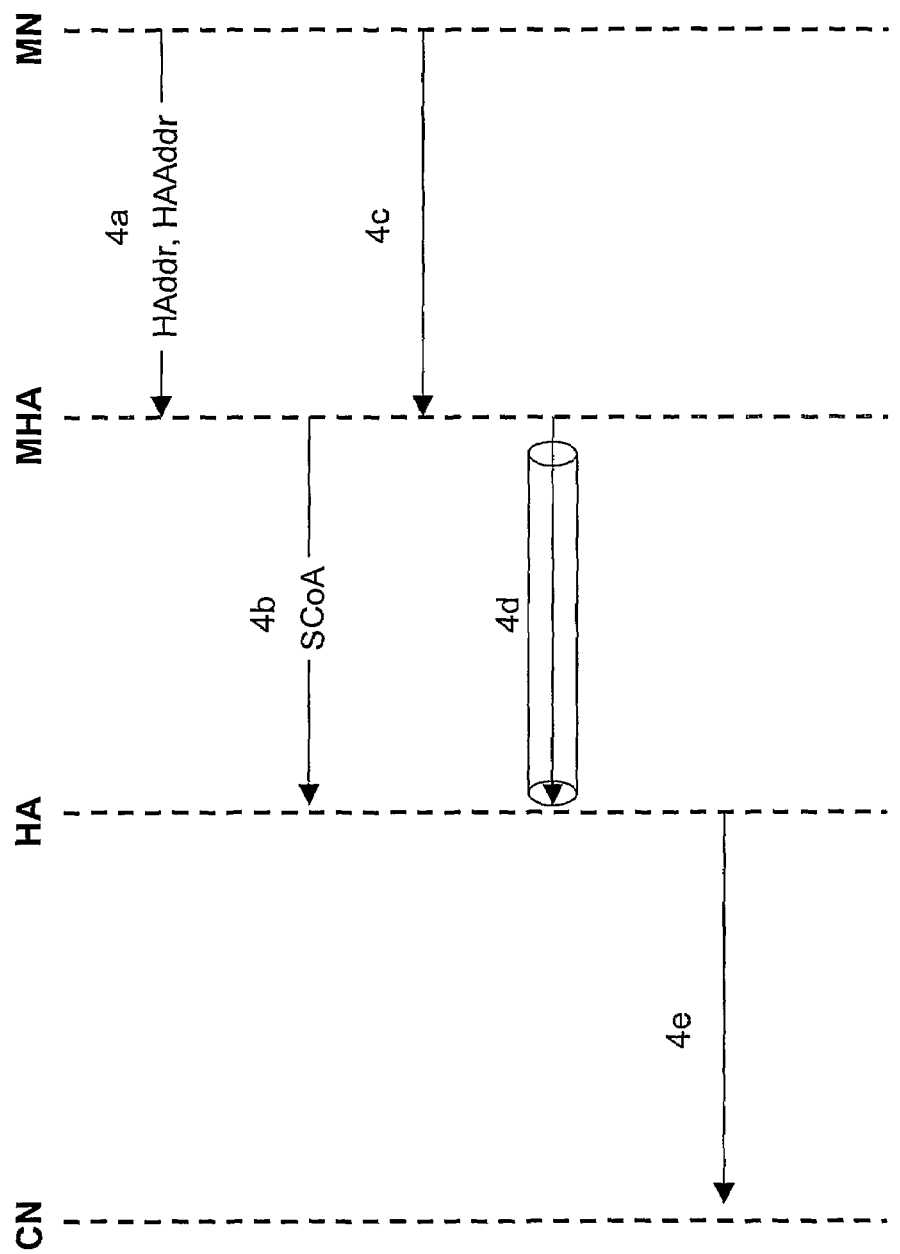
FIG. 7a is a time diagram illustrating a fourth embodiment of the invention, in which data is sent from the MN to the CN via the tunnel from the MHA to the HA.
Figure 7B:
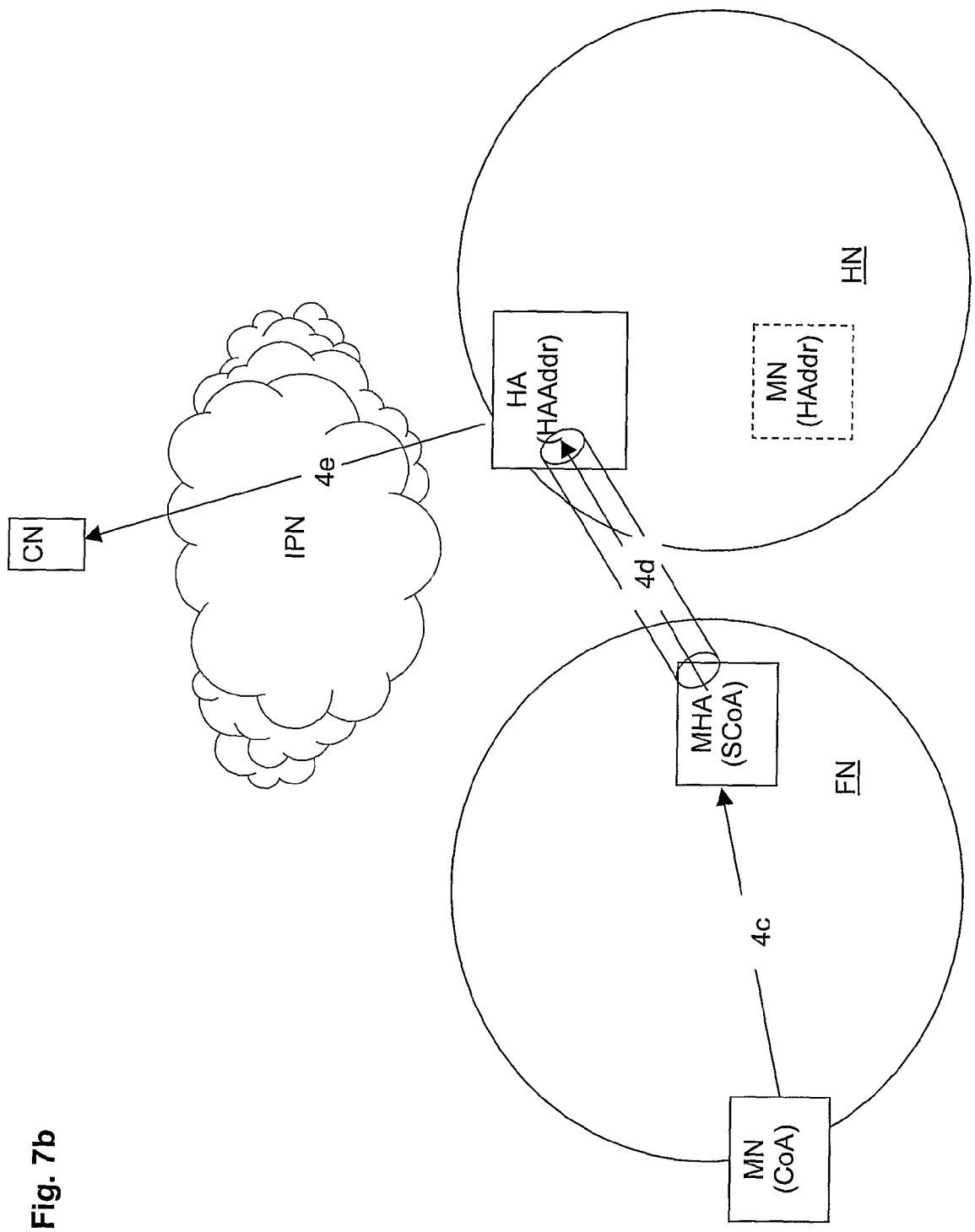
FIG. 7b is a network diagram illustrating the fourth embodiment.

As part of the registration process, shown in FIG. 7a, the MN sends a first binding update (BU) at step 4a, to notify the MHA of the HAddr and HAAddr. In a case where the MHA is not already aware of the CoA, the MN also includes the CoA in the BU. However, if the MHA is located at the gateway to the FN, it may already have been notified of the CoA by an internal process within the gateway.

Also as part of the registration process of the MN, the MHA allocates itself a Secondary Care-of Address (SCoA) which has a one-to-one mapping with the HA of the MN, and sends a second BU at step 4b to:notify the HA of the SCoA. This allows a reverse tunnel to be set up from the MHA to the HA, as will be described below.

The MN sends a packet addressed to the CN at step 4c. The MHA is configured as the default gateway or first hop for the MN, so that packets sent by the MN will always go through the MHA. When the packet arrives, the MHA checks the source address for a mapping to a SCoA in its cache. In this case, the source address is HAddr and a mapping is found. The packet is therefore forwarded through the reverse tunnel to the HA at step 4d. In other words, the packet is encapsulated as follows:

| Outer IP Header: | Src: SCoA | Dest: HAAddr |
| Inner IP Header | Src: HAddr | Dest: CNAddr |

The HA strips off the outer IP header and sends the inner packet through the IPN to the CN, at step 4*e*.

Fifth Embodiment

The fifth embodiment is a second alternative method of sending a packet from the MN within the FN to the CN. A reverse tunnel is set up directly between the MHA and the CN.

Figure 8B:
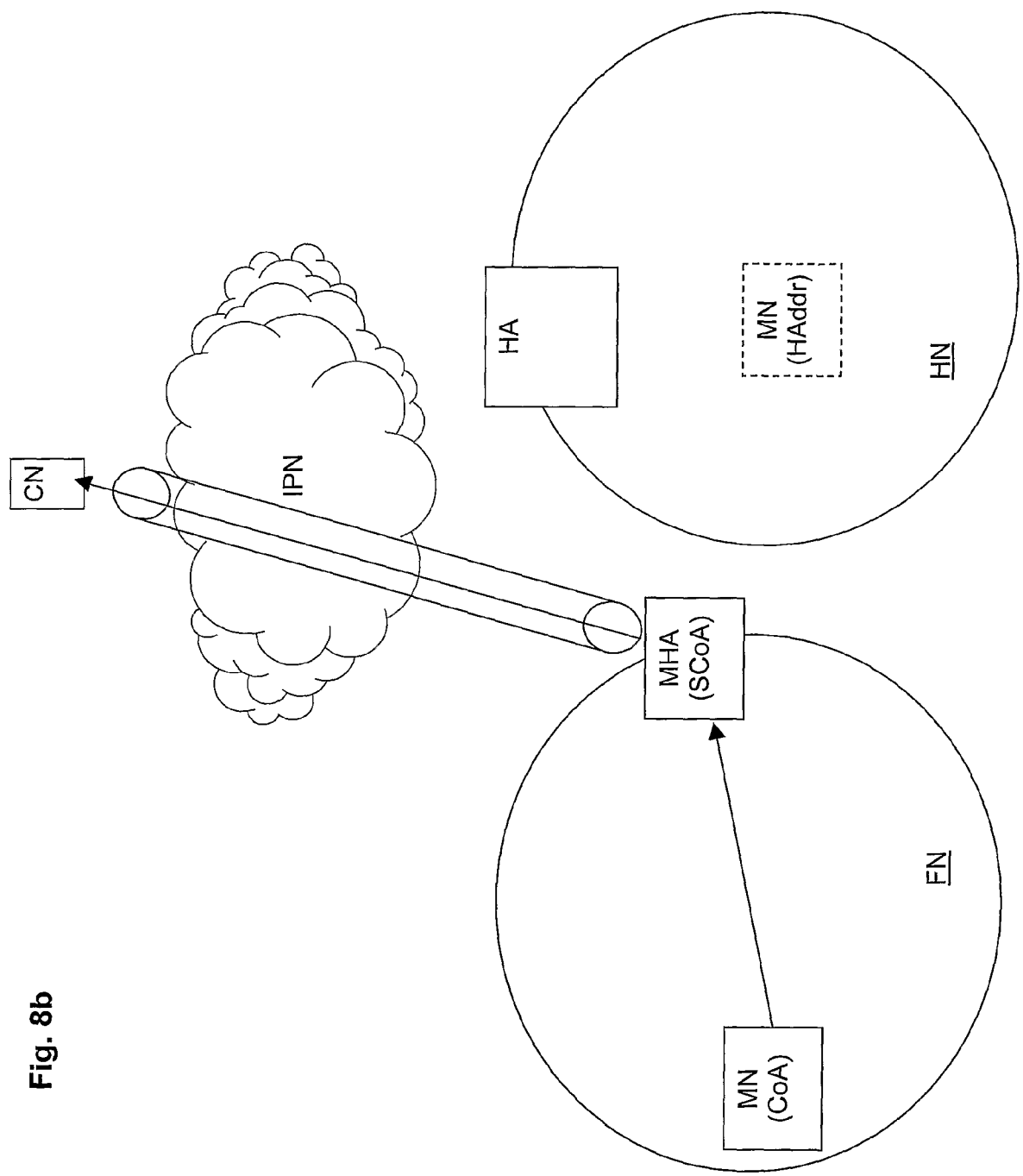
FIG. 8b is a network diagram illustrating the fifth embodiment.

As part of the registration process, shown in FIG. 8*a*, the MN sends a first binding update (BU) at step 5*a*, to notify the MHA of the HAddr and the CNAddr. In a case where the MHA is not already aware of the CoA, the MN also includes the CoA in the BU. However, if the MHA is located at the gateway to the FN, it may already have been notified of the CoA by an internal process within the gateway.

The MN may be aware of the CNAddr because it is initiating a session with the CN or was already involved in a session with the CN when the MN roamed into the FN. Otherwise, the MN may have been notified of the CNAddr by the CN, using for example the first embodiment.

Also as part of the registration process of the MN, the MHA allocates itself a Secondary Care-of Address (SCOA) which has a one-to-one mapping with the HAddr of the MN, and sends a second BU at step 5*b* to notify the CN of the SCoA. This allows a reverse tunnel to be set up directly from the CN to the MHA, as will be described below.

The MN sends a packet addressed to the CN at step 5*c*. The MHA is configured as the default gateway or first hop for the MN, so that packets sent by the MN will always go through the MHA. When the packet arrives, the MHA checks the source address for a mapping to a SCoA in its cache. In this case, the source address is HAddr and a mapping is found. The packet is therefore forwarded through the reverse tunnel to the CN at step 5*d*. In other words, the packet is encapsulated as follows:

| Outer IP Header: | Src: SCoA | Dest: CNAddr |
| Inner IP Header | Src: HAddr | Dest: CNAddr |

When the packet arrives at the CN, the mobile IP layer strips off the outer IP header and provides the inner packet to the IP layer.

Secure Binding

Since the embodiments use a new functional element, the MHA, new types of secure binding are needed between the MHA and each of the elements with which it communicates, as follows.

Between the MN and the MHA, secure binding similar to that used for binding between the MN and the HA, as defined in MIPv6, can be adopted. Between the HA and the MHA, secure binding similar to that used between the Foreign Agent and the HA, as defined in MIPv4, can be used.

For binding between the CN and the MHA, secure binding is guaranteed by the MN if a secure binding is achieved between the MN and the MHA. The MHA trusts information about CN's only from those MN's with which the MHA has established secure bindings.

Ingress Filters

In the first to third embodiments described above, roaming of the MN into the FN during a session may causes the destination address of packets entering the FN to change from the HAddr to the SCoA during a session. If a destination-based packet filter were set up at the gateway of the FN, such as a traffic flow template (TFT), the change of destination address could lead to packets being blocked. As there is a one-to-one mapping between the HAddr and the SCoA and the SCoA is used as the destination address for the encapsulated packets, the problem can be avoided by the MHA updating the filter to link the SCoA to the HAddr and thereby apply the same filtering policy to packets addressed to the SCoA.

Implementation Details

The embodiments have been described in functional terms known per se to the skilled person, who understands that the functional elements may be implemented in a variety of different ways. For example, the functions may be performed by computer programs executed at the CN, HA, MHA and MN by suitably arranged apparatus including hardware, firmware and/or software. Known MIPv6 systems may be modified by the addition of suitable computer programs, or the modification of existing computer programs, to implement the invention. These programs may be stored on carriers, including without limitation non-volatile storage media such as removable discs, flash memory, and electrical or electromagnetic signals. Further implementation details need not be included in this description, but will be readily supplied from the knowledge of the skilled reader.

The invention claimed is:

1. A method of operating a network entity at an intermediate node between a mobile node in a foreign network and a correspondent node, the method comprising:
  allocating to the mobile node a care-of address within the foreign network;
  allocating a secondary care-of address to the network entity;
  sending a packet, addressed to the correspondent node, wherein the correspondent node has a unique address, from the network entity, wherein the packet has the secondary care-of address as a source address, wherein the packet comprises a binding update, and wherein the binding update comprises an indication of the secondary care-of address;
  tunnelling, in a session between the correspondent node and the mobile node, one or more session packets from the correspondent node to the network entity, wherein the session packets have the unique correspondent node address as the source address and the secondary care-of address as the destination address;
  receiving the session packets;
  decapsulating the session packets; and
  forwarding the decapsulated session packets to the mobile node.

2. The method of claim 1, wherein the network entity translates the destination address of the session packets to a home address of the mobile node prior to forwarding the session packets to the mobile node.

3. The method of claim 1, wherein the network entity sends, in a session between the mobile node and the correspondent node, one or more session packets in a tunnel from the network entity to the correspondent node, with the care-of address as the source address and the correspondent node address as the destination address.

4. The method of claim 3, wherein the tunnelled session packets have a home address of the mobile node as an inner source address.

5. The method of claim 1, wherein the packet is a session packet in a session between the mobile node and the correspondent node.

6. A method of operating a network entity at an intermediate node between a mobile node in a foreign network and a correspondent node, the method comprising:
   allocating to the mobile node a care-of address within the foreign network;
   allocating a secondary care-of address to the network entity;
   sending a packet addressed to the correspondent node from the network entity, wherein the correspondent node has a unique address, wherein the packet has the secondary care-of address as a source address, wherein the packet comprises a binding update, and wherein the binding update comprises an indication of the secondary care-of address; and
   receiving from the correspondent node a packet addressed to the secondary care-of address of the network entity and having the unique correspondent node address as the source address,
   wherein the packet is a session packet in a session between the correspondent node and the mobile node, and the network entity forwards the session packet to the mobile node, and wherein the session packet is tunnelled from the correspondent node to the network entity and the network entity decapsulates the session packet prior to forwarding the decapsulated session packet to the mobile node.

7. The method of claim 6, wherein the network entity translates the destination address of the session packet to a home address of the mobile node prior to forwarding the session packet to the mobile node.

8. A method of operating a network entity at a node of a packet-switched data network, wherein the network entity acts as an intermediate node between a mobile node having a care-of address in a foreign network and a correspondent node, the method comprising:
   allocating to the mobile node a care-of address within the foreign network;
   allocating a secondary care-of address to the network entity, the secondary care-of address corresponding uniquely to a home address of the mobile node;
   sending a packet addressed to the correspondent node from the network entity, wherein the correspondent node has a unique address, wherein the packet has the secondary care-of address as a source address, wherein the packet comprises a binding update, and wherein the binding update comprises an indication of the secondary care-of address; and
   receiving a packet for the mobile node addressed with the secondary care-of address and having the unique correspondent node address as the source address,
   wherein the packet is a session packet in a session between the correspondent node and the mobile node, and the network entity forwards the session packet to the mobile node, and wherein the session packet is tunnelled from the correspondent node to the network entity and the network entity decapsulates the session packet prior to forwarding the decapsulated session packet to the mobile node.

9. The method of claim 8, including sending a binding update indicating the secondary care-of address to a home agent (HA) in a home network (HN) of the mobile node.

10. The method of claim 8, further comprising translating the destination address of one or more session packets, received from the correspondent node in a session between the correspondent node and the mobile node, from the secondary care-of address to the home address prior to forwarding the one or more session packets to the mobile node.

11. The method according to claim 1, wherein the network entity is located at a gateway to the foreign network.

12. The method according to claim 11, further comprising configuring the network entity as the default gateway of the mobile node.

13. The method according to claim 1, further comprising configuring the network entity as the first hop of the mobile node.

14. The method according to claim 1, wherein the network entity and the mobile node are configured to use MIPv6 protocols.

15. A non-transitory computer readable medium comprising instructions which, when executed, cause the method of claim 1 to be performed.

16. A non-transitory computer readable medium comprising instructions which, when executed, cause the method of claim 6 to be performed.

17. A hardware apparatus configured to perform the method of claim 1.

18. A non-transitory computer readable medium comprising instructions which, when executed, cause the method of claim 8 to be performed.

* * * * *